(12) United States Patent
Okumura

(10) Patent No.: US 7,628,539 B2
(45) Date of Patent: Dec. 8, 2009

(54) BEARING MECHANISM, CARRIAGE ASSEMBLY, AND MAGNETIC DISK DRIVE

(75) Inventor: Tadashi Okumura, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 728 days.

(21) Appl. No.: 11/246,751

(22) Filed: Oct. 6, 2005

(65) Prior Publication Data

US 2006/0083453 A1 Apr. 20, 2006

(30) Foreign Application Priority Data

Oct. 14, 2004 (JP) .............................. 2004-299701

(51) Int. Cl.
*F16C 11/04* (2006.01)

(52) U.S. Cl. ..................... 384/446; 384/517; 360/99.08

(58) Field of Classification Search ................ 384/446, 384/517, 518; 360/99.08, 240
See application file for complete search history.

(56) References Cited

U.S. PATENT DOCUMENTS 6,461,047 B2 * 10/2002 Mauro ........................ 384/206

6,961,212 B1 * 11/2005 Gustafson et al. ........ 360/99.08
2003/0044096 A1 3/2003 Koyama et al.

FOREIGN PATENT DOCUMENTS

JP 2003-077237 3/2003

* cited by examiner

*Primary Examiner*—William C Joyce
(74) *Attorney, Agent, or Firm*—Townsend and Townsend and Crew LLP; John Henkhaus

(57) ABSTRACT

Embodiments of the invention are directed to keeping a height of a pivot bearing low in order to build a thinner magnetic disk drive. In one embodiment, a ball bearing is provided between a shaft and a sleeve. An inner race of the ball bearing is secured to the shaft through bonding or the like. An outer race of the ball bearing is secured to the sleeve through bonding or the like. A bearing ball is placed between the inner race and the outer race of the ball bearing. A magnet is fitted to the outer race of the ball bearing. A magnet is mounted on a circular plate mounted on one end of the shaft. The magnet is located at a position opposing the magnet mounted on the outer race so as to generate a repulsive force therebetween.

3 Claims, 3 Drawing Sheets

BEARING MECHANISM, CARRIAGE ASSEMBLY, AND MAGNETIC DISK DRIVE

CROSS-REFERENCES TO RELATED APPLICATIONS

This application claims priority from Japanese Patent Application No. JP2004-299701, filed Oct. 14, 2004, the entire disclosure of which is incorporated herein by reference.

BACKGROUND OF THE INVENTION

The present invention relates generally to a bearing mechanism, a carriage assembly having a head arm mounted on a bearing mechanism, and a magnetic disk drive mounted with a carriage assembly, and more particularly, to a structure of a bearing mechanism.

A magnetic disk drive includes a spindle motor portion, a carriage portion, an actuator portion, and a base and cover portion. The spindle motor portion includes a magnetic disk secured onto a spindle hub by means of a disk clamp. The carriage portion includes a pivot bearing for rotatably moving a magnetic head, which is supported by a suspension mounted on a head arm, to any desired position on the magnetic disk. The actuator portion includes a magnetic circuit for driving the carriage portion. The base and cover portion accommodates all of the aforementioned portions.

The pivot bearing forming part of the carriage portion must be capable of instantaneously and accurately rotating the magnetic head performing reading and writing operations to any given location on the magnetic disk. An extremely high rotational accuracy is therefore required of the pivot bearing. A high bearing stiffness is also required of the pivot bearing for the following reason. Specifically, if a natural frequency of the carriage is low, the carriage resonates during operation, thus becoming unable to accurately position the magnetic head. For these reasons, preloads in an axial direction and a radial direction are applied to a ball bearing forming the pivot bearing.

The conventional pivot bearing uses two ball bearings to provide a structure having preloads contained internally as described in Patent Document 1 (Japanese Patent Laid-open No. 2003-77237).

BRIEF SUMMARY OF THE INVENTION

The magnetic disk drive has found, in recent years, an increased number of types of systems, in which the drive is mounted. In addition to applications in personal computers (PCs), use of magnetic disk drives in portable storage devices has already begun. For portable applications, recent higher recording densities provide a sufficient storage capacity even from a single magnetic disk. The trend is therefore toward lighter, smaller, and thinner disk drives.

The existing pivot bearing requires two ball bearings for preloading the same as described above. Considering the need for a thinner magnetic disk drive, the pivot bearing serves as a factor determining a height of the carriage.

It is therefore a feature of the present invention to provide a bearing mechanism for lowering the height. It is another feature of the present invention to provide a carriage assembly for lowering the height. It is still another feature of the present invention to provide a magnetic disk drive for achieving a thinner structure.

A bearing mechanism according to one aspect of the present invention includes: a shaft; a ball bearing having an inner race mounted on the shaft; a sleeve having the shaft passing therethrough and mounted on an outer race of the ball bearing; a face disposed on one end of the shaft and opposing the ball bearing; and a preloading mechanism for applying a preload to the ball bearing between the face and the ball bearing in an axial direction and a radial direction.

In some embodiments, the face includes a circular plate mounted on one end of the shaft. The preloading mechanism includes magnets mounted on the outer race of the ball bearing and the circular plate and generating a mutually repulsive force.

In some embodiments, the face includes an extended sleeve. The preloading mechanism includes magnets mounted on the inner race of the ball bearing and the sleeve and generating a mutually repulsive force.

In specific embodiments, the face includes a circular plate mounted on one end of the shaft. The preloading mechanism includes a thrust bearing disposed between the outer race of the ball bearing and the circular plate.

In specific embodiments, the face includes an extended sleeve. The preloading mechanism includes a thrust bearing disposed between the inner race of the ball bearing and the sleeve.

A carriage assembly according to another aspect of the present invention includes a bearing mechanism, a head arm, a suspension, a magnetic head, and a coil. The bearing mechanism includes: a shaft; a ball bearing having an inner race mounted on the shaft; a sleeve having the shaft passing therethrough and mounted on an outer race of the ball bearing; a face disposed on one end of the shaft and opposing the ball bearing; and a preloading mechanism for applying a preload to the ball bearing between the face and the ball bearing in an axial direction and a radial direction. The head arm is mounted on the sleeve. The suspension is mounted on the head arm. The magnetic head is mounted on the suspension. The coil is mounted on the sleeve.

In some embodiments, the face of the bearing mechanism includes a circular plate mounted on one end of the shaft. The preloading mechanism of the bearing mechanism includes magnets mounted on the outer race of the ball bearing and the circular plate and generating a mutually repulsive force.

In some embodiments, the face of the bearing mechanism includes an extended sleeve. The preloading mechanism of the bearing mechanism includes magnets mounted on the inner race of the ball bearing and the sleeve and generating a mutually repulsive force.

In specific embodiments, the face of the bearing mechanism includes a circular plate mounted on one end of the shaft. The preloading mechanism of the bearing mechanism includes a thrust bearing disposed between the outer race of the ball bearing and the circular plate.

In specific embodiments, the face of the bearing mechanism includes an extended sleeve. The preloading mechanism of the bearing mechanism includes a thrust bearing disposed between the inner race of the ball bearing and the sleeve.

A magnetic disk drive according to another aspect of the present invention includes a base, a spindle motor, a magnetic disk, a bearing mechanism, a head arm, a suspension, a magnetic head, a coil, and a magnetic circuit. The spindle motor is mounted on the base. The magnetic disk is mounted on a rotating shaft of the spindle motor. The bearing mechanism includes: a shaft mounted on the base; a ball bearing having an inner race mounted on the shaft; a sleeve having the shaft passing therethrough and mounted on an outer race of the ball bearing; a face disposed on one end of the shaft and opposing the ball bearing; and a preloading mechanism for applying a preload to the ball bearing between the face and the ball bearing in an axial direction and a radial direction. The head arm is mounted on the sleeve. The suspension is mounted on the head arm. The magnetic head is mounted on the suspension and reads information from, and writes information to, the magnetic disk. The coil is mounted on the sleeve. The magnetic circuit is fixed to the base and rotatably drives the head arm in cooperation with the coil.

In some embodiments, the face of the bearing mechanism includes a circular plate mounted on one end of the shaft. The preloading mechanism of the bearing mechanism includes magnets mounted on the outer race of the ball bearing and the circular plate and generating a mutually repulsive force.

In some embodiments, the face of the bearing mechanism includes an extended sleeve. The preloading mechanism of the bearing mechanism includes magnets mounted on the inner race of the ball bearing and the sleeve and generating a mutually repulsive force.

In specific embodiments, the face of the bearing mechanism includes a circular plate mounted on one end of the shaft. The preloading mechanism of the bearing mechanism includes a thrust bearing disposed between the outer race of the ball bearing and the circular plate.

In specific embodiments, the face of the bearing mechanism includes an extended sleeve. The preloading mechanism of the bearing mechanism includes a thrust bearing disposed between the inner race of the ball bearing and the sleeve.

According to the present invention, a bearing mechanism for lowering the height, a carriage assembly for lowering the height, and a magnetic disk drive for achieving a thinner structure can be provided.

DETAILED DESCRIPTION OF THE INVENTION

Figure 5:
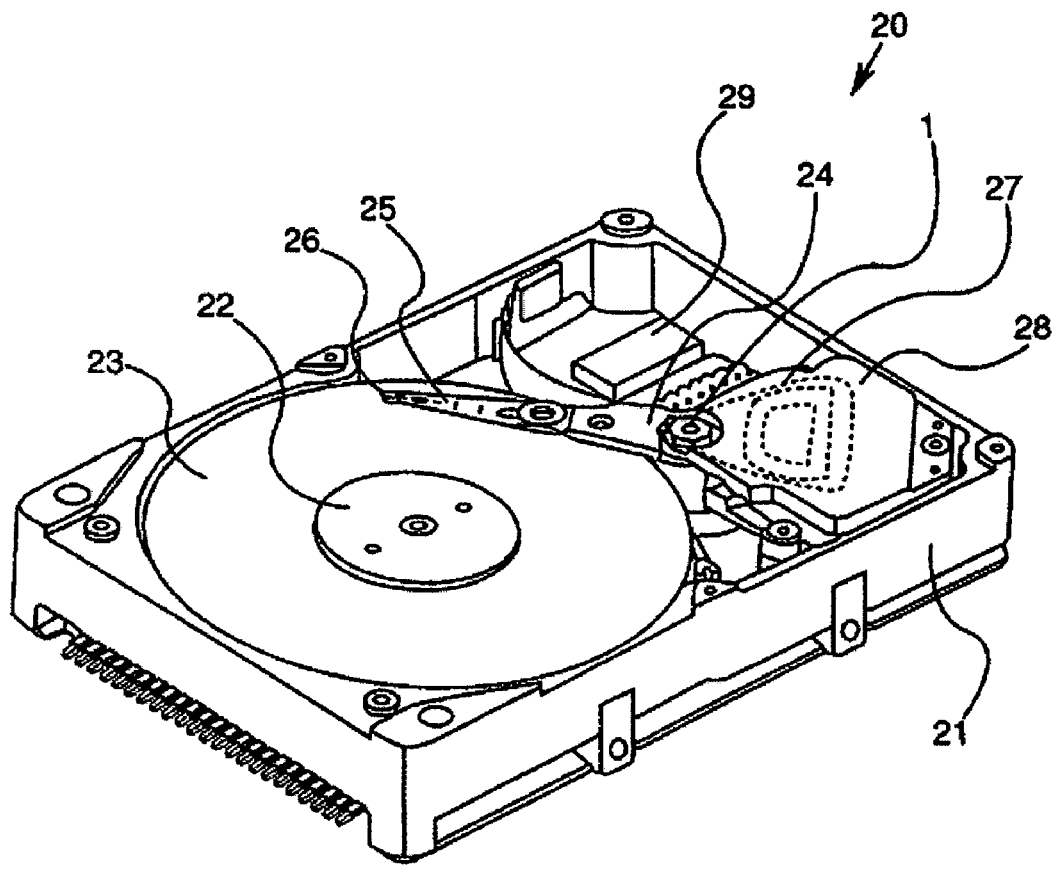
FIG. 5 is a perspective view showing a magnetic disk drive mounted with a carriage assembly using a pivot bearing according to the present invention.

A structure of a magnetic disk drive 20 mounted with a carriage assembly using a bearing mechanism (a pivot bearing) according to the present invention will be described with reference to FIG. 5. FIG. 5 is a perspective view showing the magnetic disk drive 20 with a cover thereof removed. A spindle motor 22 is secured to a base 21. A magnetic disk 23 is mounted on a rotating shaft of the spindle motor 22. A pivot bearing 1 is attached to the base 21. A head arm 24 and a coil 27 are mounted on the pivot bearing 1. A suspension 25 is mounted to the head arm 24. A magnetic head 26 is fitted to a leading end of the suspension 25. A magnetic circuit 28 forming part of a voice coil motor (an actuator) is provided for the base 21 so as to sandwich the coil 27. When current is passed through the coil 27, a thrust force is generated in the coil 27, causing the head arm 24 to make a rotatable motion about the pivot bearing 1. This positions the magnetic head 26 attached to the leading end of the suspension 25 at any desired radial point in the magnetic disk 23. The magnetic head 26 is thus allowed to read or write information. A reference numeral 29 represents an electronic circuit for processing signals from the magnetic head 26 and from external devices.

Figure 6:
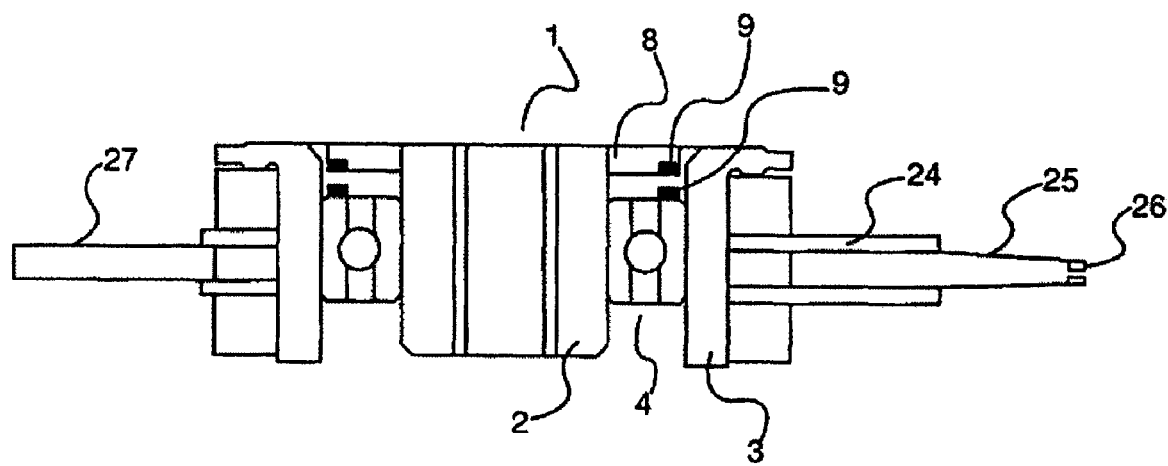
FIG. 6 is a cross-sectional view showing a carriage assembly using a pivot assembly according to the present invention.

The structure of the carriage assembly used in the pivot bearing 1 according to an embodiment of the present invention will be described with reference to a cross-sectional view shown in FIG. 6. A bearing mechanism 1 includes a shaft 2, a sleeve 3, a ball bearing 4, a circular plate 8, and a preloading mechanism 9. The shaft 2 is fixed to the base 21. The shaft 2 is passed through the sleeve 3. The ball bearing 4 is disposed between the shaft 2 and the sleeve 3. The circular plate 8 is mounted to one end of the shaft 2. The preloading mechanism is disposed between the circular plate 8 and the ball bearing 4. The head arm 24 is mounted to an outer periphery of the sleeve 3 of the bearing mechanism 1. The suspension 25 is mounted on the head arm 24. The magnetic head 26 is attached at the leading end of the suspension 25. The coil 27 forming part of the voice coil motor and extending in a direction opposite to the head arm 24 is mounted on the outer periphery of the sleeve 3.

Figure 1:
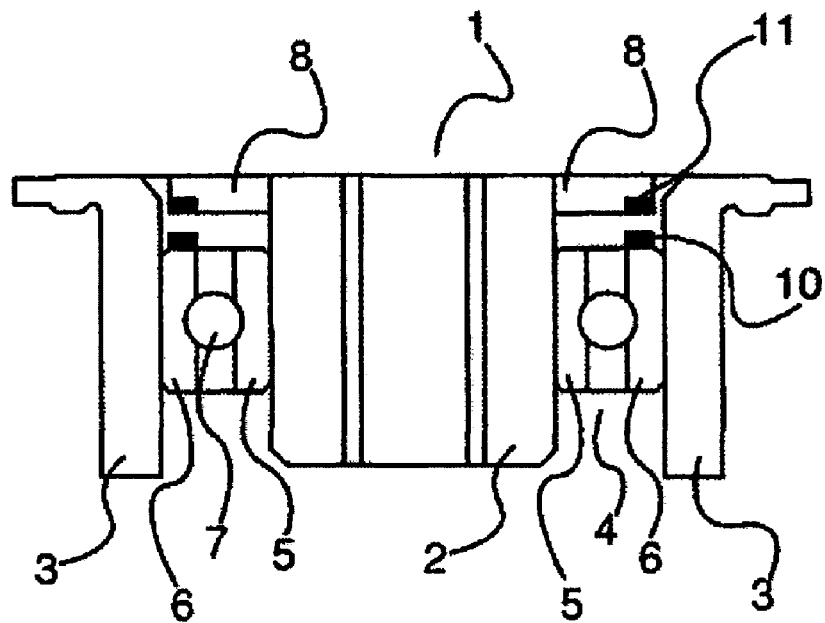
FIG. 1 is a cross-sectional view showing a pivot bearing according to a first embodiment of the present invention.

The pivot bearing 1 according to specific embodiments of the present invention will be described in detail with reference to FIGS. 1 through 4. FIG. 1 is a view showing the pivot bearing 1 according to a first embodiment of the present invention. One ball bearing 4 is disposed between a shaft 2 and a sleeve 3. An inner race 5 of the ball bearing 4 is secured to the shaft 2 through bonding or the like. An outer race 6 of the ball bearing 4 is secured to the sleeve 3 through bonding or the like. A bearing ball 7 is placed between the inner race 5 and the outer race 6 of the ball bearing 4. A magnet 10 is fitted to the outer race 6 of the ball bearing 4. A magnet 11 is mounted on a circular plate 8 mounted on one end of the shaft 2. The magnet 11 is located at a position opposing the magnet 10 mounted on the outer race 6 so as to generate a repulsive force therebetween. The repulsive force of the magnet 10 and the magnet 11 pushes the outer race 6 of the ball bearing 4 in an axial direction. The bearing ball 7 is then sandwiched between the inner race 5 and the outer race 6, thus giving a preload. The structure allows one ball bearing to give a preload in the axial and radial direction.

According to the first embodiment of the present invention, the number of ball bearings forming the pivot bearing can be reduced by one. This contributes to a reduced height of the pivot bearing. This, in turn, contributes to a reduced height of a carriage assembly for a magnetic disk drive using this pivot bearing. Further, it is possible to make thinner an entire body of the magnetic disk drive mounted with the carriage assembly using this pivot bearing.

Figure 2:
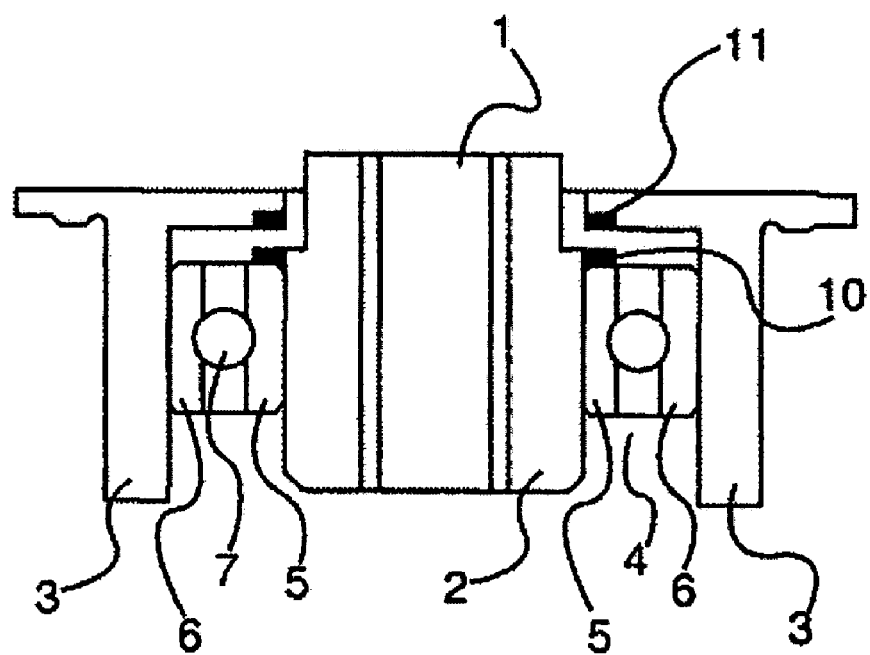
FIG. 2 is a cross-sectional view showing a pivot bearing according to a second embodiment of the present invention.

FIG. 2 is a view showing the pivot bearing 1 according to a second embodiment of the present invention. A magnet 10 is mounted on an inner race 5 of a ball bearing 4. A magnet 11 is mounted on a portion extended toward a shaft 2 from a sleeve 3 (extended sleeve). The magnet 11 is located at a position opposing the magnet 10 mounted on the inner race 5 so as to generate a repulsive force therebetween. The repulsive force of the magnet 10 and the magnet 11 pushes the inner race 5 of the ball bearing 4 in an axial direction. A bearing ball 7 is then sandwiched between the inner race 5 and the outer race 6, thus giving a preload. The structure allows one ball bearing to give a preload in the axial and radial direction. The same effect as produced from the first embodiment of the present invention can be obtained in the second embodiment of the present invention.

Figure 3:
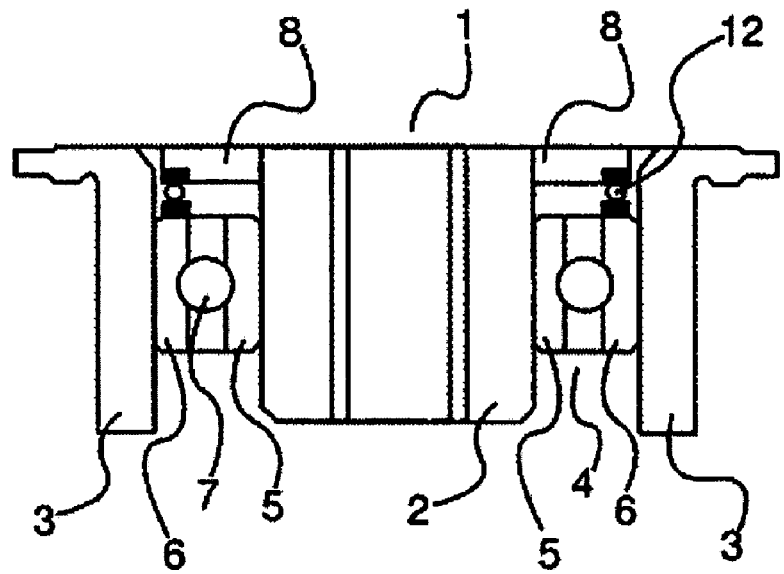
FIG. 3 is a cross-sectional view showing a pivot bearing according to a third embodiment of the present invention.

FIG. 3 is a view showing a pivot bearing according to a third embodiment of the present invention. A thrust bearing 12 is disposed between an outer race 6 of a ball bearing 4 and a circular plate 8 fitted to a shaft 2. Pushing the outer race 6 in an axial direction causes a bearing ball 7 to be sandwiched between an inner race 5 and the outer race 6, thus giving a preload in the axial and radial direction. The structure according to the third embodiment of the present invention gives the thrust bearing 12 a height that is substantially half that of an ordinary ball bearing 4. The thrust bearing 12 may be fitted on an underside of the outer race 6. The same effect as produced from the first embodiment of the present invention can be obtained in the third embodiment of the present invention.

Figure 4:
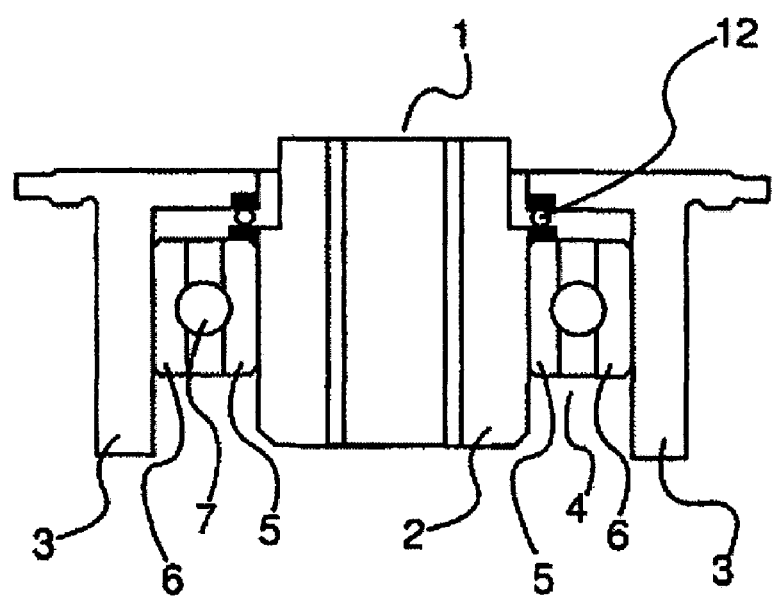
FIG. 4 is a cross-sectional view showing a pivot bearing according to a fourth embodiment of the present invention.

FIG. 4 is a view showing a pivot bearing according to a fourth embodiment of the present invention. A thrust bearing 12 is disposed between an inner race 5 of a ball bearing 4 and a portion extending from a sleeve 3 in a direction of a shaft 2

(extended sleeve). Pushing the inner race 5 in an axial direction causes a bearing ball 7 to be sandwiched between the inner race 5 and an outer race 6, thus giving a preload in the axial and radial direction. The structure according to the fourth embodiment of the present invention gives the thrust bearing 12 a height that is substantially half that of an ordinary ball bearing 4. The thrust bearing 12 may be fitted on an underside of the inner race 5. The same effect as produced from the first embodiment of the present invention can be obtained in the fourth embodiment of the present invention.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A bearing mechanism, comprising:

a shaft;

a ball bearing having an inner race mounted on the shaft;

a sleeve having the shaft passing therethrough and mounted on an outer race of the ball bearing;

a face disposed on one end of the shaft and opposing the ball bearing; and a preloading mechanism configured to apply a preload to the ball bearing between the face and the ball bearing in an axial direction and a radial direction;

wherein the face includes a circular plate mounted on one end of the shaft and the preloading mechanism includes magnets mounted on the outer race of the ball bearing and the circular plate and generating a mutually repulsive force.

2. A carriage assembly, comprising:

a bearing mechanism including a shaft, a ball bearing having an inner race mounted on the shaft, a sleeve having the shaft passing therethrough and mounted on an outer race of the ball bearing, a face disposed on one end of the shaft and opposing the ball bearing, and a preloading mechanism configured to apply a preload to the ball bearing between the face and the ball bearing in an axial direction and a radial direction;

a head arm mounted on the sleeve;

a suspension mounted on the head arm;

a magnetic head mounted on the suspension; and a coil mounted on the sleeve;

wherein the face of the bearing mechanism includes a circular plate mounted on one end of the shaft and the preloading mechanism of the bearing mechanism includes magnets mounted on the outer race of the ball bearing and the circular plate and generating a mutually repulsive force.

3. A magnetic disk drive, comprising:

a base;

a spindle motor mounted on the base;

a magnetic disk mounted on a rotating shaft of the spindle motor;

a bearing mechanism including a shaft mounted on the base, a ball bearing having an inner race mounted on the shaft, a sleeve having the shaft passing therethrough and mounted on an outer race of the ball bearing, a face disposed on one end of the shaft and opposing the ball bearing, and a preloading mechanism configured to apply a preload to the ball bearing between the face and the ball bearing in an axial direction and a radial direction;

a head arm mounted on the sleeve;

a suspension mounted on the head arm;

a magnetic head mounted on the suspension and reading information from, and writing information to, the magnetic disk;

a coil mounted on the sleeve; and a magnetic circuit fixed to the base and rotatably driving the head arm in cooperation with the coil;

wherein the face of the bearing mechanism includes a circular plate mounted on one end of the shaft and the preloading mechanism of the bearing mechanism includes magnets mounted on the outer race of the ball bearing and the circular plate and generating a mutually repulsive force.

* * * * *